United States Patent
Guo et al.

(10) Patent No.: US 7,600,117 B2
(45) Date of Patent: Oct. 6, 2009

(54) MANDATORY ACCESS CONTROL SCHEME WITH ACTIVE OBJECTS

(75) Inventors: Jinhong Katherine Guo, West Windsor, NJ (US); Stephen L. Johnson, Erdenheim, PA (US); Il-Pyung Park, Princeton Junction, NJ (US)

(73) Assignee: Panasonic Corporation, Osaka (JP)

( * ) Notice: Subject to any disclaimer, the term of this patent is extended or adjusted under 35 U.S.C. 154(b) by 783 days.

(21) Appl. No.: 10/953,745

(22) Filed: Sep. 29, 2004

(65) Prior Publication Data

US 2006/0075508 A1    Apr. 6, 2006

(51) Int. Cl.
*H04L 29/06* (2006.01)
*G06F 17/30* (2006.01)

(52) U.S. Cl. .............. 713/166; 713/165; 713/167; 726/30; 707/9

(58) Field of Classification Search ............... None
See application file for complete search history.

(56) References Cited

U.S. PATENT DOCUMENTS

| | | | |
|---|---|---|---|
| 5,937,159 A | 8/1999 | Meyers et al. | |
| 5,940,591 A | 8/1999 | Boyle et al. | |
| 6,023,765 A | 2/2000 | Kuhn | |
| 6,044,466 A | 3/2000 | Anand et al. | |
| 6,289,462 B1 | 9/2001 | McNabb et al. | |
| 6,304,973 B1 | 10/2001 | Williams | |
| 6,430,561 B1 * | 8/2002 | Austel et al. | 707/9 |
| 7,243,235 B2 * | 7/2007 | Guo et al. | 713/176 |

OTHER PUBLICATIONS

Biba, "Integrity Considerations for Secure Computer Systems", MITRE Technical Report MTR-3153, MITRE Corporation, 1975, 69 pages.
Fraser, "LOMAC: Low Water-Mark Integrity Protection for COTS Environments", Proceedings of the 2000 IEEE Symposium on Security and Privacy, 2000, 16 pages.
Dieter Gollmann, "Computer Security", Wiley, 1999, 2 pages.
E. Amoroso, "Fundamentals of Computer Security Technology", Prentice Hall, 1994, 11 pages.

* cited by examiner

*Primary Examiner*—Jung Kim
(74) *Attorney, Agent, or Firm*—Harness, Dickey & Pierce, PLC

(57) ABSTRACT

Access control is mediated by a set of 2-tuple labels or attributes which are associated with subject and object entities, respectively. Subject entitles, such as processes, have separate read and write attributes, while object entities, such as files, have separate integrity and write control attributes. The system implements a set of rules to provide both integrity control and confidentiality protection. Specifically, write operations to an object are inhibited where the subject's write attribute is lower than the write control attribute of the object. Read operations from an object are inhibited where the subject's read attribute is lower than the object's integrity attribute. When a subject reads from an object having a lower integrity level than the subject's read attribute, the subject's read attribute is demoted.

5 Claims, 2 Drawing Sheets

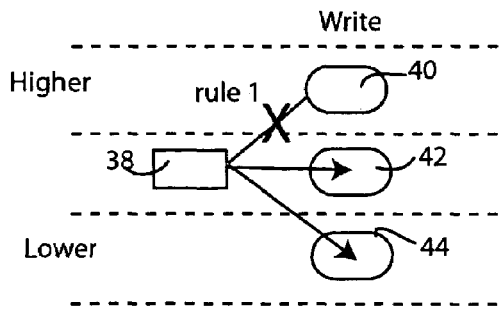
Fig. 2
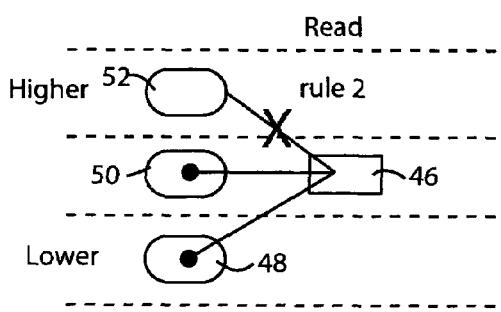
Fig. 3
Fig. 4

MANDATORY ACCESS CONTROL SCHEME WITH ACTIVE OBJECTS

FIELD OF THE INVENTION

The present invention relates generally to access control, also sometimes referred to as authorization. More particularly the invention relates to an improved access control scheme that employs active objects which play an active role in mediating access. Our control scheme uses two security attributes labels for each object and subject and is able to provide integrity control as well as confidentiality protection to the system employing it.

BACKGROUND OF THE INVENTION

Historically, access control models are classified in two broad categories: discretionary and mandatory. Traditional operating systems rely on discretionary access control (DAC) mechanisms for system security. However, these mechanisms are vulnerable to tampering and bypass. Discretionary access control mechanisms are purely based on user identity and file ownership and are relatively easy to compromise. This is due to the existence of a superuser that has unlimited access. Once superuser status is granted to a process, it can access all critical data and execute all processes including malicious code intentionally or unwittingly. Mandatory access control (MAC) mechanisms, on the other hand, can be defined to enforce security policies over all the objects and subjects in the system including the superuser. Minimum privileges can be configured for each user, object or subject. Even processes initiated by the superuser may not access an object unless permitted by the current security policy and the security properties of the process and the object being accessed.

Access control mechanisms can be classified according to an access matrix model that identifies subjects (typically processes) and objects (such as files) and that assigns privilege sets. The access matrix model organizes the security of a system into a two-dimensional matrix of authorizations, in which each subject-object pair corresponds to a set of allowed access modes. Access matrix models can be further classified into two groups, those that allow no privilege revision (NPR) and those that do allow privilege revision (PR). In systems based on NPR models, the privileges of subjects will never change, while systems based on PR models will permit change in privilege of certain subjects. How privileges are changed depends on the fundamental operations that trigger the revision. Privileged revision (PR) models may be further divided into privilege revision on invocation (PRI) models, privilege revision on observe (PRO) models and privilege revision on modify (PRM) models.

Existing mandatory access control mechanisms have largely focused on processes. Thus processes are carefully evaluated to check if a requested operation should be granted while objects are normally passive. Mandatory access control mechanisms employ security models or security policies to dictate whether requested operation should be granted. Sometimes such polices will concentrate on confidentiality (the Bell-LaPadula model, for example) while others concentrate on integrity (the Biba and Clark-Wilson models, for example). A popular integrity protection model in use today is the Low Water-Mark mandatory access control mechanism. The Low Water-Mark mechanism was first proposed by Biba as a PR model. The Low Water-Mark model defines two functional parts: access mediation and access monitoring. In the Low Water-Mark model all subjects (processes) and objects (files, etc.) are assigned an integrity level. Subjects are typically assigned the integrity level of the file containing the program being executed by the subject. One example of an implementation of Low Water-Mark Mandatory Access Control mechanism is LOMAC on the Linux kernel.

According to the Low Water-Mark model, when a subject accesses an object, the integrity level of the subject is compared with the integrity level of the object. If the subject's integrity level is greater than or equal to the integrity level of the object, the access is allowed to proceed (according to the normal Linux DAC mechanism, for example). Otherwise access is denied. This comprises the access mediation or control part of the two-part model. If the access is allowed (by both the LOMAC and the normal Linux DAC, for example) and the access is a read operation (e.g., an observe operation) then the integrity level of the subject is set to the integrity level of the object (a possible reduction). This comprises the access monitoring part of the two-part model.

There are several mechanisms to modify and/or bypass this behavior in certain policy-defined cases. Biba's Low Water-Mark Mandatory Access Control utilizes "no write-up" rules to protect the integrity of the system. Each subject and object in the system carries a security level indicating its integrity level. If a higher integrity subject reads from a lower integrity object, its integrity level will be demoted to the level of the object it read from. After the demotion, the subject cannot write to the higher integrity objects. This protects against scenarios, such as a Trojan riding on a superuser status, that would overwrite the higher integrity data after accessing lower integrity malicious code. Overall, the Low Water-Mark Mandatory Access Control mechanism is simple and mostly effective in fending off integrity attack. However, it does not protect higher integrity data from leaking.

Traditionally, the security labels on the objects only determine if a subject can read or write to it. The traditional role based security in operating systems such as Linux will let the objects carry a permission to specify if a type of user can access the object. For example, some of the files can be read/write/execute by the users within the same group. However, the object does not specify if it can only be written into certain integrity level objects.

SUMMARY OF THE INVENTION

In our access control scheme we add a special set of security labels or attributes. The set includes an additional security label that determines if the object can be placed at another location in the file system. The set of security labels gives the objects a more active role than in conventional mandatory access control mechanism. For this reason we call our objects active objects. We assign two security labels to each object. The first label represents the object's integrity level. This integrity level determines the place in the file system that the object can be placed. The second label of the security attributes indicate the integrity level of the subjects that are allowed to write into this object.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a series of write examples, illustrating how the 2-tuple architecture mediates the writing process;

FIG. 3 is a series of read examples, illustrating how the 2-tuple architecture mediates the reading process;

FIG. 4 is a diagrammatic summary of rules used to implement the security architecture depicted in FIGS. 2 and 3.

DETAILED DESCRIPTION OF THE PREFERRED EMBODIMENTS

The following description of the preferred embodiment(s) is merely exemplary in nature and is in no way intended to limit the invention, its application, or uses.

Figure 1:
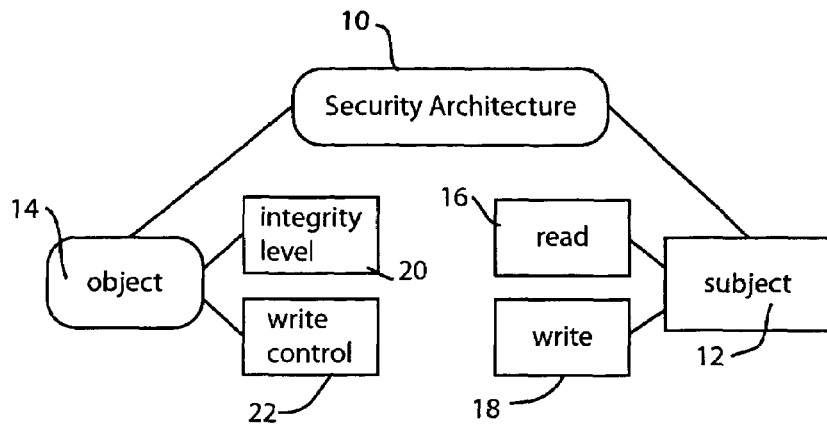
FIG. 1 is a system architecture diagram illustrating a preferred 2-tuple security labeling scheme applied to both subjects and objects.

Referring to FIG. 1, a presently preferred security architecture is illustrated at 10. The architecture recognizes both subject entities 12 and object entities 14. Subjects represent entities that produce or consume data, such as users, agents, processes, threads, and the like. Objects represent data stores, such as files, streams, media content, communication channels (e.g., UNIX pipes) and the like. Objects may be adapted to be read from, written to, or both, depending on the object's purpose. Thus subjects may be configured to read from objects and write to objects, depending on the system requirements. If desired, subjects can read from one object and write the data obtained to another object. Thus the architecture supports the copying of selected contents from one object to be written to another object. These processes will be illustrated in connection with FIGS. 2 and 3.

The security architecture defines a first 2-tuple security label for subject entities and a second 2-tuple security label for object entities. The subject security labels are designated in FIG. 1 as read label or read attribute 16 and write label or write attribute 18. These labels or attributes are associated with each subject 12 and are used by the security architecture during the access control mediation process. By employing separate read and write attributes, our control scheme is able to support more sophisticated security policies, as will be described below.

In addition, object entities 14 are also given different labels, which are designated in FIG. 1 as integrity level label or attribute 20 and write control label or attribute 22. These labels or attributes are associated with each object 14 and are also used by the security architecture during the access control mediation process. The integrity level attribute 20 provides a metric by which a security aspect of the object can be classified. Trusted objects would receive a higher integrity level attribute than untrusted ones. The write control attribute serves a different function. It specifies the minimum write attribute that a subject must have in order to write to that object. Thus if the write control attribute of object A is set to 4, a subject having write attribute of 4, 5, or 6 (for example) could write to object A. A subject having a write attribute of 1, 2 or 3 could not.

The present description adopts the following nomenclature to designate the 2-tuple labels or attributes:

object(integrity level, write control)

subject(read, write)

Thus an object with the integrity level attribute set to HIGH and the write control attribute set to LOW would be represented as:

object(HIGH, LOW).

Similarly, a subject with the read attribute set to LOW and the write attribute set to HIGH would be represented as:

subject(LOW, HIGH)

In the examples presented above, the 2-tuple labels or attributes have been illustrated as having two states, namely, HIGH and LOW. In fact, the architecture is not limited to two-state attributes; rather, any number of states are possible (n-states are possible). These n-states must simply be ordered so that an "equal to", "higher than" or "lower than" determination can be made. Thus in a five state system, a label of 4 would be deemed "higher than" 3 and "lower than" 5.

FIGS. 2 and 3 will now be used to explain how the 2-tuple labels are employed. FIG. 2 illustrates various different examples where data is written to an object. FIG. 3 illustrates various different examples where data is read from an object. In FIGS. 2 and 3 swim lanes have been illustrated using dotted lines, to designate different "higher than" and "lower than" levels. Thus the relevant attribute associated with object 42 (FIG. 2) is higher than that of object 44, but lower than that object 40. In FIGS. 2 and 3, the relevant rule responsible for blocking data transfer has been indicated. The rules are stated in FIG. 4. Thus, Rule 1 prevents subject 38 from writing into object 40. This is because the write attribute of subject 38 is lower than the write control attribute of object 40. In contrast, subject 38 may write into objects 42 and 44, because the write attribute of subject 38 is equal to or higher than the write control attribute of those respective objects. Similarly, Rule 2 prevents subject 46 from reading from object 52. This is because the read attribute of subject 46 is lower than the integrity attribute of object 52. Subject 46 is permitted to read from objects 48 and 50, which have integrity attributes lower than or equal to the read attribute of subject 46.

The access control architecture of our invention improves upon conventional architectures in several respects. For example, one shortcoming of the Low Water-Mark Mandatory Access Control model, as discussed above, is that it will only protect the integrity of the system by the no write-up rule. It will not protect the system confidentiality since a high integrity level process can still write into a lower integrity object with the high integrity data it carries. In our approach, the integrity level associated with the objects will prevent the data being copied into a lower integrity file.

To maintain the functionality of the system using a Low Water-Mark Access Control Mechanism, certain programs have to be granted trusted status. The UNIX syslogd operation is such an example. The system log daemon needs to access objects of almost all integrity levels as it needs to log all the system activities. By granting it an exempted status, it can read any low integrity data while still be able to write into even the highest integrity objects. As a matter of fact, the high integrity object that syslogd needs to write into is /var/log. Adding the first security label enables us to avoid granting syslogd exempted trusted status. Since /var/log/messages is one place that syslogd will need to write into, it is assigned the 2-tuple security label. One of these two labels indicates that this object is of the highest integrity as it is part of the system data. The other permits a lower integrity level process writing into it. Even if syslogd is demoted to low integrity level after reading /home, it should still be able to write into /var/log/messages since that file allows lower integrity processes to write into it. However, its integrity level remains high in the file system as defined by the security attributes.

FIG. 5 illustrates such an example. Even though the security model extends to multiple integrity levels, we use a two level integrity definition in all the examples in this report. Process A and B are both login processes that need to write into /var/log/messages. Process A has the integrity level of (HIGH, HIGH) while process B has the integrity level of (HIGH, LOW). In this example, the write attribute of processes A and B are both started HIGH as syslogd. Once process B accesses the .bashrc file in /home user directory, it is demoted to LOW. In the case of LOMAC, process B should be prevented from writing into /var/log/messages since the integrity of files in /var/log are defined as HIGH. This interrupts the normal system logging, thus, promoting the exemption of syslogd. With this exempted status, syslogd is able to write to any HIGH integrity files regardless the LOW integrity objects it has previously accessed, opening security holes.

Figure 5A:
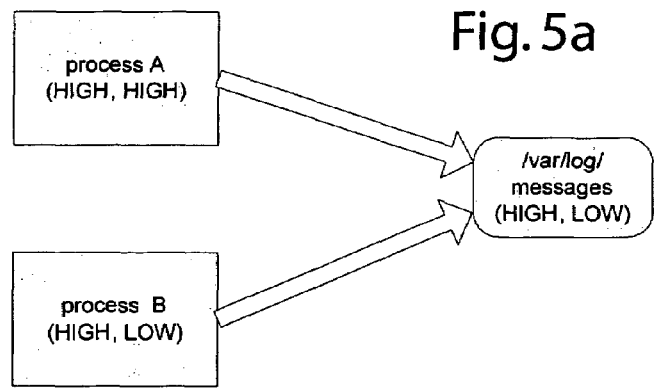
FIGS. 5*a* and 5*b* provide examples of the security architecture in use, illustrating examples where processes A and B are permitted to write to an exemplary "messages" object and further illustrating that the contents of the messages object is not permitted to be copied to the "home" object.
Figure 5B:
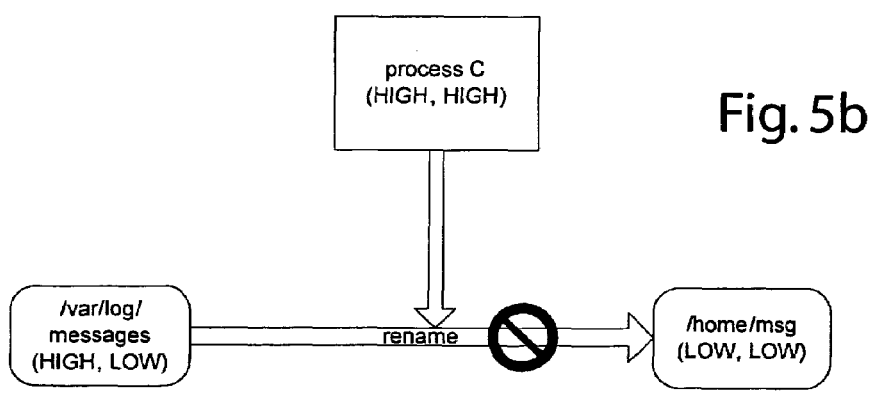

In our scheme, as show in FIG. 5a, without the exempted status, process B (the demoted syslogd) is still able to write into /var/log/messages since this object allows LOW write attribute to write into it. However, as illustrated in FIG. 5b, when a process (even with HIGH read/write privileged) tries to rename /var/log/message (HIGH, integrity) to /home/msg (LOW integrity), the operation is prohibited. This added security would not only eliminate the need to exempt certain processes, but also protect system data from copying into unrestricted sections in the file system.

Unlike most mandatory access control mechanism, we separate the read and write integrity for the subjects to add more control. The subject also has a 2-tuple security label. The first label indicates the integrity level of object it can read from while the second label indicates the write control level of the objects it can write into.

Unlike objects, which have static security attributes, subject attributes can change, depending on the object being accessed. When a subject reads a lower integrity object, demotion occurs, to avoid the possibility of contamination. That is, when a subject reads from a lower integrity object, its write privilege (the attribute that indicate the write control level of objects it can write into) is demoted. To be more specific, if a subject reads from a lower integrity object, the subject's write integrity (second security label) will be demoted to the integrity level of the object (the second security label of the object). The security label for reading is mostly static, i.e., it remains unchanged. If situations arise later that require demoting a process's read privilege (for specific application requirements), that can be handled individually. Since most of the subjects should be able to read from all the files to have the system function normally, most of the subjects should have a relatively high read integrity. However, we can add an additional security to the system by assigning an untrusted process a LOW read integrity to limit its read access in the system. An example of this is for a game program downloaded from the Internet. Its security label can be assigned to (LOW, LOW). By doing this, we not only prevented it from writing into the high integrity data, but also prevented it from reading the high integrity data.

The foregoing has covered the basic rules for mediation and monitoring with an emphasis on how our approach differs from the LOMAC model. The details for mediation and monitoring in our control scheme will now be presented. The mediation process determines if a system call can be granted. We protect confidentiality by blocking the lower read attribute subjects from reading from higher integrity objects. If the subject's read privilege is lower than the object's integrity level, we deny the read action from executing. Note that this is different from the techniques advocated in the Biba model and from the techniques employed in popular UNIX systems today. In the original Biba model, there were no specific rules for reading an object. In implementation, the original LOMAC developed for Linux kernel 2.2 follows more closely to the Biba model; it basically allows lower integrity level subject to read from a higher integrity object if it is not blocked by the UNIX discretionary access control mechanism. The later implementation of FreeBSD, by default, allows the opening of a higher integrity object unless that object is marked LOWNOOPEN.

To avoid opening security holes by granting certain process a trusted status, we allow some write-up when the object allows a lower level subject to write into it. This is defined by the second security label associated with the objects.

A subject can be contaminated after it reads from a low integrity file. To prevent it from contaminating other subjects or objects, it should not be able to write into objects or subjects whose integrity level is higher than that of the object it read from. Monitoring process deals with whether the subject should be demoted. If a subject reads from a lower integrity object, its write privilege is demoted to the integrity level of the object it just read from.

Next, we use an access matrix to illustrate if an access is allowed and if the subject is demoted from reading lower integrity files. The example we give is of a bi-integrity level (attributes exist in only HIGH and LOW states). Of course, the concept can be readily extended to multi-level applications, where attributes could be assigned to have more than two states.

TABLE 1

Example of mediation and monitoring

|  |  | subject | | | |
| --- | --- | --- | --- | --- | --- |
|  |  | LOW, LOW | LOW, HIGH | HIGH, LOW | HIGH, HIGH |
| object | LOW, LOW | Yes, yes | Yes, yes | Yes, yes | Yes, yes (demote) |
|  | LOW, HIGH | Yes, no | Yes, yes | Yes, no | Yes, yes (demote) |
|  | HIGH, LOW | No, yes | No, yes | Yes, yes | Yes, yes |
|  | HIGH, HIGH | No, no | No, yes | Yes, no | Yes, yes |

In Table 1, the row with the security labels is the security attributes for subjects while the column with the security labels are the security attributes for the objects. The corresponding cell indicates if a read (first operation in this illustration) or write (second operation) is permitted. If a demotion results from reading, it is also marked in the cells. In such cases, the write privilege (the second security label) will change from HIGH to LOW. The security attributes changes from (HIGH, HIGH) to (HIGH, LOW).

To utilize the above mandatory access control mechanism, the system would be configured accordingly. Using the example in Table 1, examples of system configuration is as following.

1. Most of the objects in the system section should be defined (HIGH, HIGH), such as /etc/rc.d.
2. Some objects in the system section should be defined (HIGH, LOW), such as /var/log/messages, to allow lower integrity processes writing into it while still keep its integrity level HIGH.
3. User files and downloaded files should be configured as (LOW, LOW), such as the files in the /home directory.
4. The executables in the system section should be configured as (HIGH, HIGH), such as yppasswd.
5. Most of the executables in the user directory should be configured as (HIGH, LOW), such as user generated applications.
6. Untrusted executables such as downloaded game, etc., should be configured as (LOW, LOW). This will totally block the untrusted program from reading HIGH integrity objects, let alone writing into them.

Even though we illustrated the mandatory access control mechanism in terms of two integrity levels, the scheme allows multiple integrity levels depending on the system needs.

The foregoing has presented a new mandatory access control model. The security scheme prevents confidentiality when necessary by blocking subjects with lower read privilege from reading from higher integrity objects. It also eliminates the need to exempt processes and provides tighter granulites comparing to the Low Water-Mark Access Control scheme. It prevents unwanted copying and leaking of private and secure data.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An access control system for mediating access to an electronic resource comprising:

an object entity residing in a computer memory having the following attributes each associated with integrity of the object entity:
an integrity level attribute, and
a write control attribute;
a subject entity residing in the computer memory having the following attributes each associated with integrity of the subject entity:
a read attribute, and
a write attribute;
wherein the integrity of the object entity and the subject entity is enforced by employing an access mediation rules system that is embedded as computer executable instructions in the computer memory and that implements the following rules with respect to said object entity and said subject entity:
a first rule whereby writing by said subject entity into said object entity is inhibited if the write attribute of said subject entity is lower than said write control attribute of said object entity;
a second rule whereby reading by said subject entity of said object entity is inhibited if the read attribute of said subject entity is lower than said integrity level attribute of said object entity; and
a third rule whereby the write attribute of said subject entity is demoted to the level of said integrity level attribute of said object entity when said subject entity reads from said object entity and the integrity level attribute of said object entity is lower than the read attribute of said subject entity.

2. The system of claim 1 wherein at least one of the attributes of said object entity is configured to represent at least two states.

3. The system of claim 1 wherein at least one of the attributes of said object entity is configured to represent more than two states.

4. The system of claim 1 wherein at least one of the attributes of said subject entity is configured to represent at least two states.

5. The system of claim 1 wherein at least one of the attributes of said subject entity is configured to represent more than two states.

* * * * *

UNITED STATES PATENT AND TRADEMARK OFFICE
CERTIFICATE OF CORRECTION

PATENT NO. : 7,600,117 B2 Page 1 of 1
APPLICATION NO. : 10/953745
DATED : October 6, 2009
INVENTOR(S) : Jinhong Katherine Guo et al.

It is certified that error appears in the above-identified patent and that said Letters Patent is hereby corrected as shown below:

Title Page, item 57 Abstract, Column 2, Line 3:
"entitles" should be --entities--

Signed and Sealed this

Fifth Day of January, 2010

David J. Kappos
*Director of the United States Patent and Trademark Office*